United States Patent
Traylor

(10) Patent No.: US 6,244,115 B1
(45) Date of Patent: Jun. 12, 2001

(54) FLOW METER FOR MONITORING LIQUID FLOW AT LOW OR INTERMITTENT RATES

(76) Inventor: Paul L. Traylor, 19171 La Loma, San Ana, CA (US) 92705

( * ) Notice: Subject to any disclaimer, the term of this patent is extended or adjusted under 35 U.S.C. 154(b) by 0 days.

(21) Appl. No.: 09/061,663

(22) Filed: Apr. 16, 1998

(51) Int. Cl.⁷ .............................. G01F 1/00; G01F 23/02
(52) U.S. Cl. .................................. 73/861.49; 73/861.42; 73/861.51; 73/299; 116/276
(58) Field of Search ............................ 73/861.42, 861.49, 73/861.51, 326, 329, 299, 323; 137/216; 116/276

(56) References Cited

U.S. PATENT DOCUMENTS

| | | | |
|---|---|---|---|
| 221,521 | * 11/1879 | Church | 73/861.49 |
| 1,202,977 | * 10/1916 | Drake | 116/276 |
| 1,649,602 | * 11/1927 | Ledoux et al. | 73/861.51 |
| 1,715,281 | * 5/1929 | Davenport | 116/276 |
| 1,858,399 | * 5/1932 | Jones | 73/861.49 |
| 2,306,142 | * 12/1942 | Semet | 73/861.51 |
| 2,361,269 | * 10/1944 | Coes, Jr. | 73/861.49 |
| 3,020,757 | * 2/1962 | Parish | 73/861.49 |
| 5,305,778 | * 4/1994 | Traylor | 137/216 |

FOREIGN PATENT DOCUMENTS

86839 * 5/1896 (DE) .

* cited by examiner

Primary Examiner—Hezron Williams
Assistant Examiner—Michael Cygan
(74) Attorney, Agent, or Firm—J. F. McLellan

(57) ABSTRACT

A flow meter for monitoring liquid flow at low or intermittent rates, such as waste water gravity flow from a reverse osmosis system. Water flow from the system enters a meter chamber vented to atmosphere. Water drainage from this chamber is adjusted to match the incoming water flow, and the level at which this occurs is determinative of the rate of waste water flow. Various ways are disclosed to adjust the rate of water drainage from the chamber, including the use of multiple drainage tubes.

21 Claims, 2 Drawing Sheets

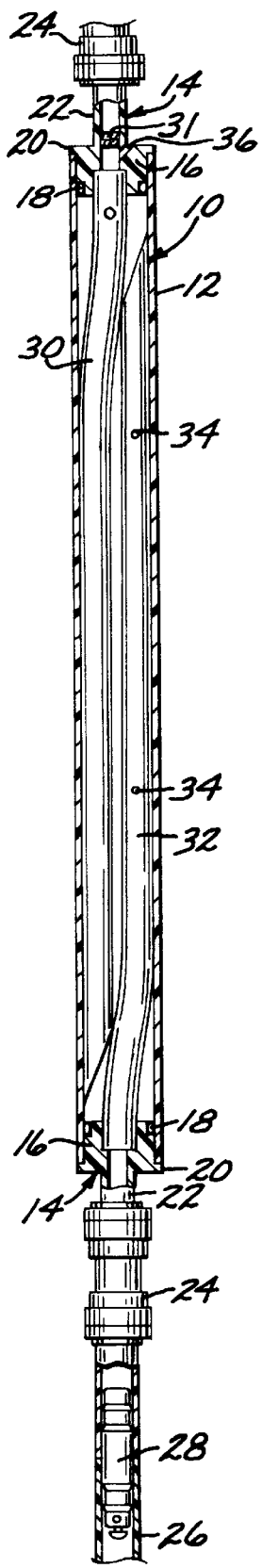
FIG. 1
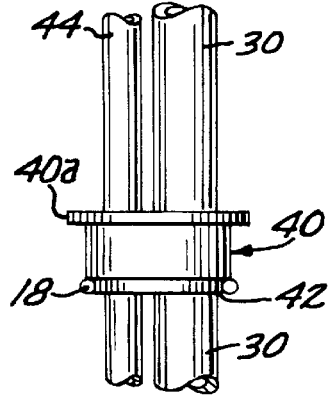
FIG. 2
FIG. 3
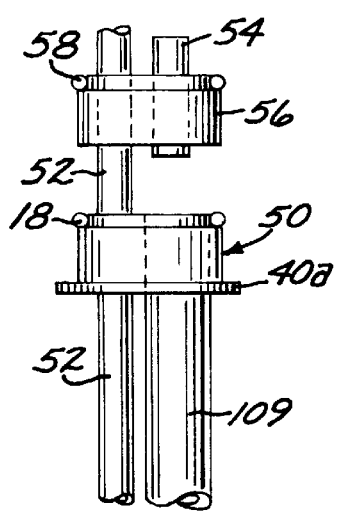
FIG. 4
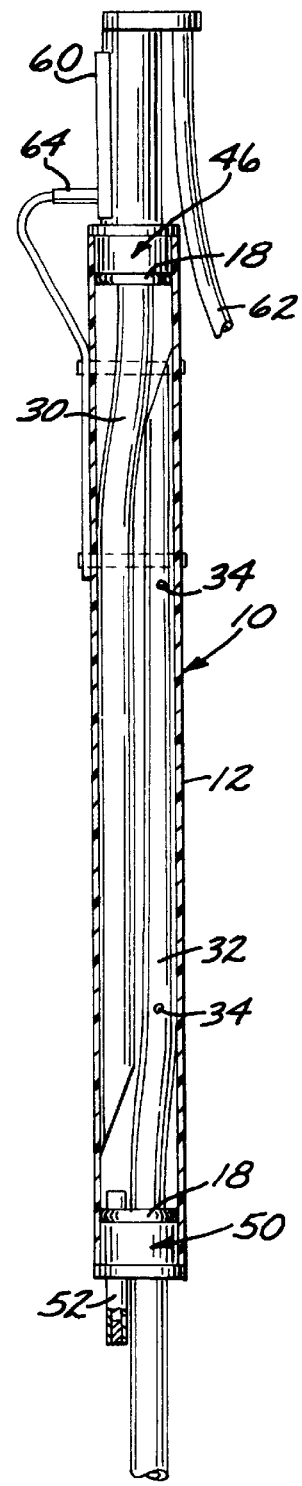
FIG. 5

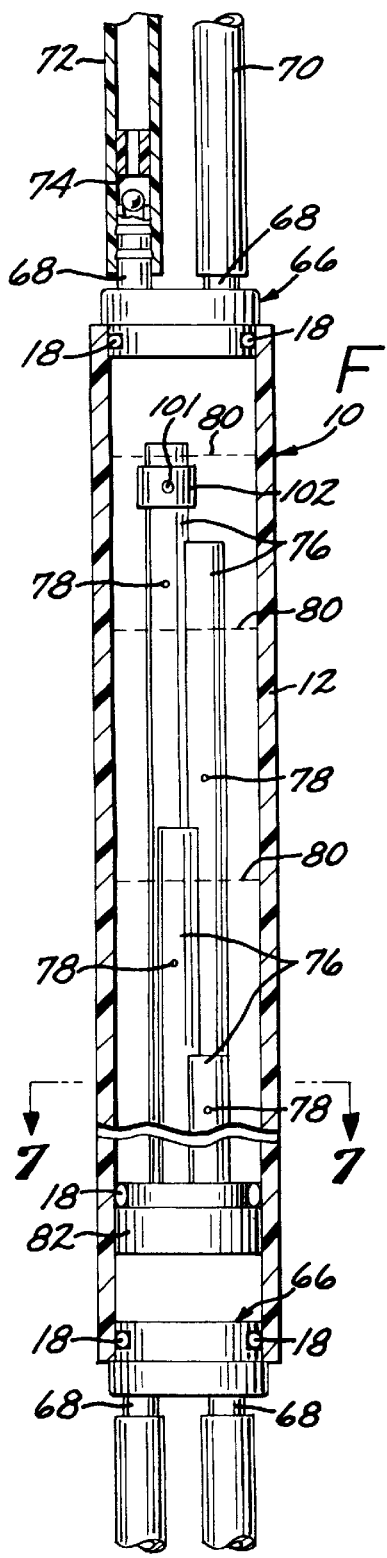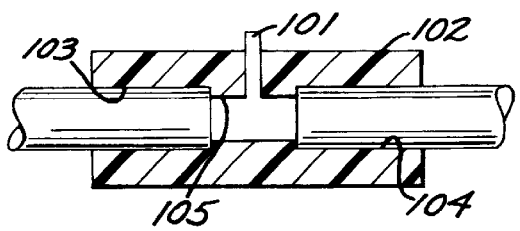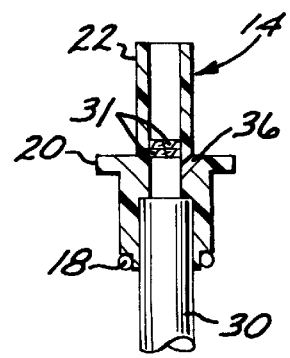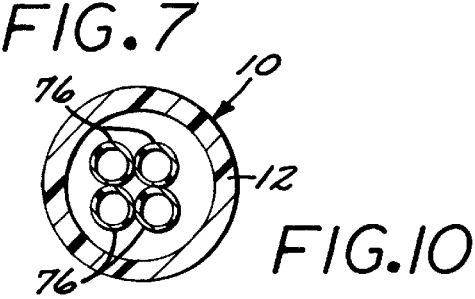

FLOW METER FOR MONITORING LIQUID FLOW AT LOW OR INTERMITTENT RATES

BACKGROUND OF THE INVENTION

1. Field of the Invention

The present invention relates to a flow meter for monitoring liquid flow at low or intermittent rates, particularly waste water gravity flow from a reverse osmosis system.

2. Description of the Prior Art

Prior art flow meters for measuring relatively low rates of liquid flow are typically vertically oriented, with the liquid whose flow rate is to be measured being admitted under pressure at the bottom of the meter. The meters usually include a moving part, such as an impeller, bobbin, ball or float, which is acted upon and raised by the upwardly flowing liquid. In one form of meter a float is movable vertically along a guide rod, the extent of vertical float travel being indicative of the liquid flow rate.

This type of prior art meter requires a significant amount of constant or continuous liquid flow, usually in the order of 10 or more ounces per minute, to move the float upwardly along the guide rod. The very low, sometimes discontinuous droplet flow of liquid through the usual reverse osmosis (RO) waste water exit conduit would be ineffective to raise the float. Attempted measurement of a typical RO droplet flow rate of ½ to 3 ounces per minute therefore would not be practical or particularly accurate. In addition, since RO droplet flow is normally a gravity induced flow into a vented chamber, the prior art float type meters dependent upon pressure would not be appropriate, and would be totally unsuited to measurement of RO waste water flow.

Other problems with the prior art float type meter are that they are typically expensive, and many do not provide linear scale readings.

There is a need in the prior art for a meter capable of continuously monitoring the rate of flow of RO waste water. Continuous monitoring is important for a user to determine if the RO system is operating properly, particularly whether maintenance or replacement of a component is needed. For example, a predetermined waste flow rate could be established which would indicate unacceptable clogging of the RO system membrane element that it should be cleaned or replaced.

For domestic or non-commercial RO waste water systems, the waste water flow is about 1 to 3 ounces or approximately 30 to 90 milliliters per minute. If a lower rate of flow is experienced it could indicate that there is a tear in the membrane or a failure of some other upstream system component that is allowing untreated water to bypass the waste water drainage line.

There are other reasons for the use of an accurate, low cost flow meter. Certain types of RO units are characterized by periodic high levels of waste water flow at predetermined time intervals to provide a "fast flush" mode. The flow may be increased to perhaps 50 ounces or about 1500 milliliters per minute. This produces a relatively turbulent flow of waste water across the RO membrane, which tends to dislodge or scrub away the typical membrane accumulation of contaminants that are relatively unaffected by the normal drip flow rate of RO waste water. It is important to be able to determine and monitor the establishment and duration of such increased flows to insure proper operation of the RO system in a fast flush mode.

As previously mentioned, most prior art flow rate meters require an upward flow of the liquid against a float or the like. The position of the float is indicated by markings or graduations provided on the meter at suitable vertical intervals. However, as noted earlier, such graduations are frequently not linear, that is, they are not uniformly spaced apart to show equal increments of flow rate increase. For example, a graduation located midway between a 4 ounce graduation and a 5 ounce graduation does not necessarily indicate a rate of flow of 4 and ½ ounces per minute.

This makes it difficult for a user to accurately determine the rate of flow for some float position located between two markings. The need to interpolate between such markings becomes more critical with a smaller domestic RO system, for example, in which the waste water output is between 1 and 2 ounces per minute versus a larger system output of perhaps 90 to 100 ounces per minute. Unless the meter is a more expensive custom designed version to render it linear, the user, maintenance or service technician must employ tedious and time consuming measurement alternatives such as the use of a measuring cup to collect liquid flow over a measured time period, from which the rate of flow can be calculated.

In addition to their inability to measure very low rates of flow, currently available flow meters are particularly unsatisfactory in determining the average rate of flow of an intermittent flow such as the droplet flow in domestic or household RO systems.

Such prior art flow meters also are generally available in one of several fixed scale ranges, such as 1 to 10 or 10 to 100 or 4 to 40 etc, forcing a user to select one best suited to the application. However, these would be inadequate to measure flow in much higher ranges, as in the RO systems having a fast flush feature.

SUMMARY OF THE INVENTION

According to the present invention, a flow meter is provided for measuring relatively low rates of flow or intermittent gravity flow of a liquid in an open system that is vented or open to atmosphere, such as the measurement of waste water flow in a reverse osmosis (RO) system. The flow meter has no moving parts such as bobbins or floats or the like. Therefore, it cannot be overdriven and damaged. It is generally related to an accumulator arrangement disclosed in my U.S. patent application Ser. No. 6,063,275. Jun. 12, 1997.

The flow meter is useful in RO systems as a permanently installed diagnostic meter adapted for quick and easy insertion in the waste water drain line. It comprises an elongated vertically oriented, generally constant bore central chamber closed at its ends by end fittings which can be secured within the chamber ends by adhesive or solely through a friction fit, thereby permitting easy removal and interchange of the end fittings. In a preferred embodiment the RO waste water to be measured drips by gravity into the upper extremity of the chamber, or into one or more interior conduits, and collects in the lower extremity of the chamber, gradually filling the chamber until a condition of equilibrium is achieved in which the volume of entering waste water is offset or balanced by the volume of waste water draining out of the chamber.

The flow meter preferably employs flexible drain or collector tubes located in the meter chamber, and provided with one or more drain passages leading into the tube to allow water in the chamber to pass into the collector tube or tubes for passage to a suitable drain line. Any of the collector tubes can be made in one piece, or formed of several pieces coupled together by suitable friction fit couplings, which can be used to perform double duty by being the situs of cross passages for draining the meter chamber. By adjusting the number and location of the tubes and the drain passages into them, a chamber water level can be established that represents the normal or acceptable rate of flow. Multiple tubes enable greater flexibility and accuracy in establishing the precise normal chamber water level. By selection of the proper number of collector tubes, their respective lengths, and the number and location of drain passages from the chamber into the tubes, the graduations can be made substantially linear, that is, equally vertically spaced apart for linearly increasing rates of flow.

Since the drain passages are typically quite small, they are susceptible to clogging by impurities which may be in the RO waste water. This would undesirably close the passages or change their size. Consequently, such passages can be coated with tetrafluoroethylene ("Teflon") or the like, or the passages can be formed of very small Teflon tubing forced through the walls of the collector tubes.

The number and size of the collector tubes in the chamber of the foregoing embodiment also affect the responsiveness or sensitivity of the meter. The more space the tubes occupy, the less water the chamber will accommodate. Consequently, smaller changes in rates of flow will become apparent in the changes in the level of water in the chamber.

In this regard, graduations or markings can be applied to the exterior of any of the tube or tubes, or even to a non-functional tube or solid rod located in the interior of the meter chamber, but they are preferably applied to the exterior of the chamber wall to indicate attainment of a normal rate of water flow when the water level coincides with a particular graduation. The graduations could be silk screened onto the chamber exterior or applied to a decal affixed to the exterior of the chamber. Likewise, water levels above and below the particular graduation will indicate rates of flow that are less than or greater than the normal rate of flow. The use of a decal having uniform indicia or graduations makes it extremely easy for a technician at the job site to calibrate the meter whenever desired. However, there is generally no need to further calibrate the flow meter once the proper locations of these graduations are established.

It is also envisioned that the flow meter could be made portable, and quickly connected or even be temporarily held vertical, as needed, between the RO waste water discharge line and the household drain line. Once the RO system had been diagnosed with the flow meter, the flow meter can be quickly disconnected and carried away by a maintenance person for use elsewhere.

Various end fittings can be used at the inlet and outlet ends of the chamber to suit the meter for particular applications. For example, the fittings may include screens at one or both ends to block backflow of particulate matter entering the meter or into the upstream RO system, or a flow rate control in the outlet end, or an air gap device between the meter and the RO waste drain line, or one of various combinations of drain and vent lines to drain water out of the meter chamber while continuously venting the chamber. The vent line can, if desired, include a one-way valve in the form of a ball check valve or the like to enable normal venting, but also operative to block unwanted back flow of waste water from the chamber which might occur if the chamber became filled or lightly pressurized, such as could possibly occur with fast filling of the chamber in a "fast flush" cycle. Overflow lines could also be provided to assist in draining excess waste water during a fast flush operation.

In another embodiment the flow meter includes a plurality of drain or collector tubes of different lengths. This enables water to drain from the chamber into the vertically spaced apart open upper ends of the collector tubes, thereby providing another means for precisely regulating the rate of waste water flow through the chamber, as by trial and error for example. Drainage into the open tube ends can also be done in combination with drainage through one or more cross passages extending through tube couplings between tube sections or through the tube walls, thereby offering yet another means for precisely adjusting the amount of water flow through the chamber.

The plurality of collector tubes of different lengths also enables the flow meter to indicate multiple flow rates, such as in one ounce increments from one to five, for example, and then higher up could indicate 30 to 35 ounces per minute.

Also, with selective use of multiple collector tubes and multiple bottom port or outlet connections the meter chamber can be left open or completely closed at the top end and, in either case, the venting, inlet flow, and outlet flow can all take place through the bottom end closure fitting.

Such multiple collector tubes can be located and held in position by a header or manifold press or friction fitted into the chamber adjacent its lower extremity. The manifold can be located to define a summation chamber between it and the chamber outlet. With this arrangement an intermittent or interrupted drip flow of RO waste water can be collected in the summation chamber to develop a pressure head which enables a generally more constant waste water flow out of the chamber outlet. This type of more constant flow is less noisy because of the absence of slugs of air bubbles in the flow.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 1 longitudinal cross sectional view of a flow meter according to the present invention, comprising a vertically oriented meter chamber having a single inlet tube and a single outlet or collector tube;

FIG. 2 is a longitudinal elevational view of one form of end fitting which can be used in the embodiment of FIG. 1;

FIG. 3 is a longitudinal cross sectional view of another form of end fitting which can be used in the embodiment of FIG. 1;

FIG. 4 illustrates yet another form of end fitting which can be used in the embodiment of FIG. 1, together with one form of header or manifold;

FIG. 5A is a longitudinal cross sectional view of a flow meter similar to that of FIG. 1, but employing an end fitting like that shown in FIG. 2, and also employing at its opposite end an air gap device seated within a fitting like that shown in FIG. 3.

FIG. 6 is a longitudinal cross sectional view of a flow meter similar to that of FIG. 1, but employing multiple internal collector tubes, a different endfitting, and utilizing markings or graduations on the meter chamber, as also seen in FIG. 10, to indicate different conditions, such as different rates of water flow through the chamber; and FIG. 7 is a view taken along the line 7—7 of FIG. 6;

FIG. 8 is an enlarged longitudinal cross sectional view of a typical slip fit coupling, as indicated in FIG. 6, between adjacent collector tube sections;

FIG. 9 is an enlarged longitudinal cross sectional view of the top end closure fitting of FIG. 1, showing the vent opening and internal filter screens; and FIG. 10 is an enlarged plan view of one form of decal for affixation to the exterior of the meter chamber.

DESCRIPTION OF VARIOUS EMBODIMENTS

Referring now to the drawings, and particularly to FIG. 1, a flow meter is illustrated which comprises, generally, an elongated cylindrical barrel or chamber 12, the chamber 12 is typically about 8 to 12 inches long and is made of any suitable substantially transparent plastic material which allows the interior or cavity of the chamber to be easily viewed. In the embodiment illustrated, the tubes or conduits 30 and 32 made of three-eighths inch outside diameter polyethylene material or the like are disposed within the chamber 12.

Upper and lower end fittings 14 inexpensively made of molded plastic or the like are fitted into the ends of the chamber 12. The fittings 14 preferably each mount a suitable O-ring 18 to provide a frictional seal with the chamber 12. Such frictional sealing is sufficient to prevent leakage since the chamber 12 is vented to the atmosphere and is therefore not pressurized. Of course, if desired, the fittings could be adhesively secured within the ends of the chamber to further insure against any possibility of leakage.

The upper fitting 14 includes a cylindrical portion 16 having a relatively large diameter lower passage adapted to receive the upper end of the inlet tube or conduit 30. The portion 16 also includes an intermediate flange 20 and an upwardly extending conduit portion 22 having a relatively small diameter upper passage. The conduit portion 32 is adapted for connection to a quick disconnect fitting 24 so that the upper passage can receive waste water from the RO waste water drain line (not shown).

The intermediate flange 20 seats against the adjacent end of the chamber to locate and fix the fitting 14 in position.

Similarly, the conduit portion 22 of the opposite fitting 14 at the lower end of the chamber 12 includes a larger diameter passage adapted to receive the lower end of the outlet tube or conduit 32, and a conduit portion 22 connected by a quick disconnect fitting 24 to a drain line 26. The line 26 includes a flow limiter 28 which, in addition to means such as the conduit 32, is useful in regulating the rate of drainage water from the chamber 12. If desirable, the flow limiter 28 could instead be located upstream of the fitting 24, or between the upper fitting 24 and the chamber 12, or between the chamber 12 and the lower fitting 24.

As best seen in FIG. 9, the larger diameter passage of the upper fitting 14 which receives the inlet conduit 30 also receives multiple filter screens 31. They are located or trapped between the shoulder formed in the portion 19 between the larger and smaller size passages through it and the plastic inlet conduit 30 which is press fitted in position. With this arrangement waste water from the RO waste water drain line passes through the screens, enters conduit and then enters the chamber 12.

The lower end of the inlet conduit 30 is cut at a bias, and terminates just above the base of the chamber 12 to facilitate water entry into the chamber 12. Water entry is also facilitated by a vent opening 36 located at the upper end fitting 14 to vent to atmosphere the upper end of conduit 30 and also the interior of the chamber 12 by means of an opening 36a in the upper extremity of the inlet conduit 30.

The collector tube 32 is press fitted within the larger diameter passage of the portion 16 of the lower end fitting 14. It extends upwardly into the chamber 12, and its upper end is cut on a bias and terminates near the top of the chamber 12.

If desired, screens 31 can be fitted into the lower end fitting 14 in a manner similar to that described above in connection with the upper end fitting 14.

With the foregoing arrangement the drip rate flow of RO water accumulates in the chamber until its level reaches the open upper end of the tube 32. The water then drains into the tube 32 and out the drain line 26.

If desired, one or more openings or cross passages 34 can be provided directly into the wall of the collector tube 32 to more precisely control the rate of water drainage from the chamber 12. In one operative embodiment three holes 0.042 inches in diameter were placed at spaced, predetermined locations along the length of collection tube 32.

FIG. 2 illustrates the use of a vent tube 44 disposed through a modified form of end fitting 40. The fitting 40 is press fit into the upper end of the chamber 12 in a manner similar to that described in connection with the arrangement of FIG. 1. However, the inlet conduit 30 in the chamber 12 extends upwardly and outwardly of the chamber and through an opening 42 provided in the fitting 40. In this location the conduit 30 accepts waste water from the RO waste water drain line (not shown). An opening in the fitting 40 receives a vent tube 44, which extends from the chamber interior to atmosphere.

With reference to FIG. 3, an end fitting 46 is illustrated which replaces the end fitting 14 described above. The fitting 46 includes a flange portion 48 that engages and seats, upon the upper end of the chamber 12. A cylindrical inner portion of the fitting is adapted to be pressed or adhesively cemented into the upper extremity of the chamber 12. The relatively large central opening of the fitting 46 is ample to accept the inlet conduit 30 of FIG. 1, and also vent the chamber to atmosphere. However, as will be seen, the principal function of the adapter fitting 46 is to provide a press fit seat for mounting the air gap unit 60 illustrated in FIG. 5.

Referring now to FIG. 4, the end fitting 50 illustrated is similar to the end fitting of FIG. 2 except for its location in the bottom end of the chamber 12. In this position the fitting 50 mounts a through conduit 52 which can be used to serve as a vent tube or a collector tube, or an inlet tube in special applications. The conduit 52 can extend from any external connection, through the end fitting 50 and manifold 56, to any height desired within the meter chamber 12. The principal outlet conduit from fitting 50 is a tube 109 which connects to a suitable drain line (not shown).

The manifold 56 can, if desired, mount several collector tubes 54 to drain water from the chamber 12.

Each of these tubes 54 extends upwardly through one of four openings in the header or manifold 56, the manifold 56 being vertically spaced above the end fitting 50 and frictionally held in position within the chamber 12 by an O-ring 58 that is carried by the manifold 56. The header 56 thus provides a means for mounting additional collector tubes. These tubes add further avenues for drainage of water from the chamber 12, and enable easier achievement of a neutral or balance flow condition in which the incoming water is precisely offset, at some water level in the chamber 12, by the water draining from the chamber 12.

The embodiment of FIG. 5 is substantially identical to that of FIG. 1 except that it uses a different end fitting 50 at the lower end of the chamber 12.

The opening in the fitting 50 is adapted to receive a tube 52 which can be used to vent the chamber through the fitting 50, in which case the tube 52 would extend upwardly in the chamber 12 to a point above the water level in the chamber. In FIG. 5 the tube 52 is not used for this purpose and is simply plugged.

FIG. 5 also shows an end fitting 46 like that of FIG. 3 located at the upper end of the chamber 12. The fitting 46 mounts an air gap device 60 within its central opening, the device 60 preferably being adhesively secured in position. Suitable air gaps are known in the art, the particular air gap illustrated comprising an air gap body which receives RO waste water through a relatively small inlet tube 62. The waste drip flows downwardly from the air gap into the chamber 12, the chamber being vented to atmosphere through a vent fitting 64.

Further precision and flexibility of adjustment of the rate of water drainage from the chamber 12 is provided by the embodiment of FIG. 6. In this embodiment a pair of end fittings 66 are fitted into the opposite ends, respectively, of the chamber 12. Each fitting 66 includes a cylindrical inner portion dimensioned for receipt and adhesive attachment within the inside of an end of the chamber 12. Each fitting 66 includes two integral, externally projecting tube ports 68 which provide through passages into the chamber 12.

The lower fitting 66 includes a filter or screen (not shown) which is operative in the event of a backflow to prevent particulate matter from passing upwardly through the chamber 12, and possibly contaminating or clogging the RO system or the small passageway within the chamber 12.

One of the tube ports 68 of the upper fitting 66 is connected to a tubing conduit 70 leading from the RO waste water drain line. The other tube port 68 is connected to a tubing conduit 72 which vents the chamber 12. A typical normally open one-way ball or check valve 74 is located in the conduit 72 to permit venting, but it is operative in the event of sudden backflow of excess water from the chamber 12 to move to a closed position to block escape of the water through the conduit 72. Such a backflow is not unusual in an RO system in a fast flush mode of operation.

If desired, one of the tube ports 68 in the lower fitting 66 can be plugged or can be joined with its mate to increase meter outflow capacity from the chamber 12 to a suitable drain for the RO waste water.

In the embodiment of FIG. 6 a plurality of collector tubes 76 is disposed within the chamber 12, each preferably being of a different length so that their open upper ends are at different levels. This enables successively faster drainage as the water level in the chamber rises. In addition, one or more openings or cross passages 78 are provided in the tubes 76 to add more drainage capability. By appropriate placement and selection of various lengths of tubes 76 and by determining the proper number, size and location of passages 78, different levels of water can be identified that correspond with different rates of flow. Markings or graduations 80 can then be made directly on the chamber, or on a decal 84, as illustrated in FIG. 10, affixed to the chamber, to indicate various predetermined rates of flow. If desired, the graduations could be applied to the collector tubes 76 or, as previously indicated, to a dummy collector tube or rod (not shown).

The lower ends of the collector tubes 76 are snugly received within complemental through openings in a header or manifold 82 that is frictionally held within the lower portion of the chamber 12 in spaced relation to the lower end fitting 66. The space between them constitutes an accumulator chamber which accepts intermittent flows and also drip rates of flow from the various tubes 76. Such flows collect in the accumulator chamber and establish a pressure head such that water flow from the chamber 12 is at a desired steady rate.

The operation of each of the embodiments described is generally similar. Each adjusts the rate of discharge of waste water from the chamber 12 so that it is substantially the same as the rate of flow of RO waste water into the chamber. This balanced condition causes the chamber water level to stabilize at one of the various graduations 80, establishing the particular rate of flow at that time.

The balanced condition places the water level at a particular graduation, and is indicative, for example, of a desired rate of flow. If the flow exceeds the desired rate, the level of liquid in the chamber will rise to a higher graduation. This then indicates to a service or maintenance man that perhaps the RO flow control is no longer functioning properly or, more likely, that the RO membrane is becoming clogged and may need replacement. Membrane clogging causes less potable water to be produced, and there is therefore a greater flow of waste water into the meter chamber 12. Meter indications showing excessive waste water flow could also signal that the drain lines downstream of the flow meter may be partially clogged with an accumulation of debris.

On the other hand, if the chamber water level is below the balanced flow graduation, it could indicate a lower flow than usual, which could be caused by clogging of the flow control which is found in the outlet drain port from most RO systems, or could be caused by a small leakage in the conduits and fittings located upstream of the meter 12.

The meter is also capable of other functions. For example, the downstream end can be disconnected from the drain line 26, such as at the quick disconnect fitting 24, and the meter then hand held by the technician or user testing the associated RO system. The discharge from the meter can then be allowed to pass into a suitable receptacle and the new water level in the meter would be noted.

If the water level is unchanged it would indicate that the downstream loading is normal, that is, there is no clogging of the downstream lines, and no pinching or partial closure of such lines. On the other hand, if the water level increased, it would indicate that some such undesirable loading was occurring, and correction would be instituted.

In similar fashion, the meter can be left connected at its bottom to the drain line 26, but disconnected at its upper fitting 24 in order to determine whether there are any problems with components upstream of the meter. After disconnection, a length of conduit (not shown) is connected between the meter and the outlet from the RO system, thereby bypassing upstream components normally located between the meter and the RO system. If the meter water flow rate reading is unchanged, this would be an indication of proper operation of the upstream components.

As will be apparent, the sizes and shapes of the various components of the flow meter are not critical and may be selected to best suit a particular application. Likewise, the nature of the connections between the flow meter and the associated RO waste water conduits and the household drain lines is not critical and can be selected as desired.

While several forms of the invention have been illustrated and described, it will be apparent that various modifications can be made without departing from the spirit and scope of the invention.

What is claimed is:

1. A flow meter for monitoring low and intermittent liquid flow, the flow meter comprising:
   a vertically elongated transparent main chamber having a top and a bottom, and operative to admit under gravity flow liquid to be measured;
   an upper end fitting seated within the top and including an opening for receiving a first conduit for admitting into the main chamber under gravity flow liquid to be measured, and further including an opening for receiving a second conduit adapted to continuously vent the main chamber to atmosphere;

an elongated collector conduit extending upwardly within the main chamber and having a lower extremity coupled to the outlet, the collector conduit being configured to define at least one opening for admitting liquid from the main chamber into the collector conduit for passage out of the outlet;

measurement indicia associated with the flow meter for indicating the rate of flow of the liquid through the meter over a period of time; and a plurality of additional elongated collector conduits of different lengths extending upwardly within the main chamber and having a plurality of lower extremities, respectively, the collector conduits being configured to define at least one opening for admitting liquid from the main chamber into the collector conduits.

2. A flow meter according to claim 1 and including a manifold seated within the lower part of the main chamber in spaced relation to the bottom of the chamber to define an accumulation chamber, and having a plurality of openings for receiving the lower extremities of the collector conduits, respectively, whereby the collector conduits empty liquid, under gravity flow, into the accumulator chamber, the accumulator chamber having an outlet for draining under gravity flow the liquid out of the accumulator chamber; and the meter being operative for determining the rate of flow of the liquid through the meter.

3. A flow meter for monitoring low and intermittent liquid flow, the flow meter comprising:

a vertically elongated transparent chamber having a top and a bottom and operative to admit liquid to be measured, and having an outlet for draining the liquid out of the chamber;

an upper end fitting seated within the top and including an opening for receiving a first conduit adapted for admitting liquid to be measured into the chamber, and further including an opening for receiving a second conduit adapted to continuously vent the chamber to atmosphere, the conduit having a one-way check valve adapted to vent the chamber, and further adapted to close and prevent passage of liquid out of the chamber through the second conduit;

an elongated collector conduit extending upwardly within the chamber and having a lower extremity coupled to the outlet, the collector conduit being configured to define at least one opening for admitting liquid from the chamber into the collector conduit for passage out of the outlet; and measurement indicia on the meter for indicating the level of liquid in the chamber whereby the rate of flow of the liquid through the chamber over a period of time can be determined.

4. A flow meter according to claim 3 wherein the upper end of the collector conduit is open to define the opening.

5. A flow meter according to claim 3 wherein the collector conduit includes a cross passage through the wall of the conduit to define the opening.

6. A flow meter according to claim 3 wherein the chamber is cylindrical in cross section.

7. A flow meter according to claim 5 wherein there are additional cross passages through the wall of the collector conduit at various vertical locations to provide a plurality of drain passages from the chamber into the conduit.

8. A flow meter according to claim 4 wherein the collector conduit is of a predetermined length, and including additional collector conduits of different lengths, such that the open upper ends of the collector conduits are located at different heights within the chamber for draining liquid from the chamber at different liquid levels.

9. A flow meter according to claim 8 wherein there are cross passages through the walls of the additional collector tubes at various vertical locations to provide a plurality of drain passages from the chamber into the collector conduits.

10. A. A flow meter according to claim 8 wherein the lower ends of the collector tubes are mounted to a manifold which is seated in substantially fluid tight relation within the chamber whereby the lower ends empty into an accumulator space defined between the manifold and the bottom of the chamber, the lower ends thereby being coupled to the outlet of the chamber.

11. A flow meter according to claim 3 wherein the chamber is open at its top, and including an upper end fitting seated within the top, the upper end fitting having an opening for venting the chamber to atmosphere.

12. A flow meter according to claim 3 and including a conduit for connecting the chamber outlet to a drain line, the conduit having a flow regulator operable for regulating the rate of liquid flow out of the outlet.

13. A flow meter according to claim 3 including a conduit for connecting the chamber outlet to a drain line, and further including a quick disconnect fitting between the chamber outlet and the drain line.

14. A flow meter according to claim 3 and including an upper end fitting seated within the top of the chamber, the upper end fitting mounting an air gap device for accepting the liquid to be measured, the air gap device having a vent tube coupled to the top of the chamber for venting the chamber to atmosphere.

15. A flow meter according to claim 3 wherein the chamber includes graduations along its length which are adapted to indicate the level of liquid in the chamber and thereby indicate the rate of liquid flow through the chamber in selected units of measurement.

16. A flow meter according to claim 3 wherein the chamber is open at its top, and including a lower end fitting having a pair of conduits for admitting liquid into the chamber for measurement and for draining liquid out of the chamber, respectively.

17. A flow meter according to claim 3 wherein the chamber is dosed at its top, and including a lower end fitting having a plurality of conduits for admitting liquid into the chamber for measurement, for draining liquid out of the chamber, and for venting air from the chamber to facilitate the draining.

18. A flow meter according to claim 3 wherein the chamber is vented at its top, and liquid to be measured is admitted into the chamber through its top, and wherein the chamber includes a lower end fitting having a first conduit for draining liquid out of the chamber during relatively low flow conditions, and a second conduit for draining additional liquid out of the chamber during relatively high flow conditions.

19. A flow meter according to claim 3 wherein the chamber includes an upper end fitting frictionally seated within the top, and a lower end fitting frictionally seated within the bottom whereby the fittings are quickly removable for access to the interior of the chamber.

20. A flow meter according to claim 8 wherein the chamber exterior is substantially transparent, and wherein there are cross passages through the walls of the collector tubes at various vertical locations to provide a plurality of drain passages from the chamber into the collector conduits whereby, through placement of particular numbers and sizes of the cross passages in predetermined ones of the collector tubes, the placement of graduations upon the chamber exterior at generally uniform vertical intervals will substantially represent linear changes in the liquid level in the chamber and thereby the rates of liquid flow through the chamber.

21. A flow meter according to claim 8 wherein the collector tubes are relatively large in size to displace more of the liquid in the chamber and thereby cause more pronounced changes in the height of the liquid in the chamber in response to changes in the rates of liquid flow through the chamber.

\* \* \* \* \*